Oct. 2, 1945.    D. P. GLESSNER    2,386,109
HOSE COUPLING
Filed Dec. 9, 1943
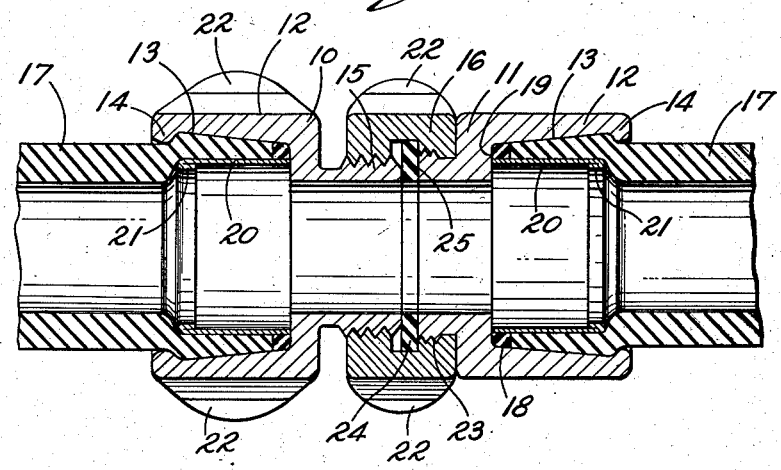
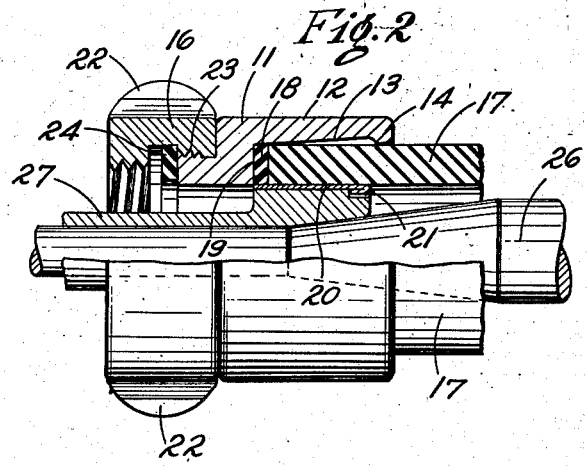
INVENTOR.
DONALD P. GLESSNER
BY
ATTORNEYS Patented Oct. 2, 1945

2,386,109

UNITED STATES PATENT OFFICE 2,386,109

HOSE COUPLING

Donald P. Glessner, Wooster, Ohio, assignor to Akron Brass Manufacturing Company, Inc., Wooster, Ohio, a corporation of Ohio Application December 9, 1943, Serial No. 513,515

2 Claims. (Cl. 285—84)

This invention relates broadly to hose couplings and more specifically to improvements in the structure of the hose clamping elements therein.

One of the objects of the invention is to provide an expansible clamping ring which will effect the impinged securement of the hose within the coupling without fracture of the fabric at the throat of the ring.

Another object of the invention is to provide a hose coupling which will accommodate the coiled assembly of the hose upon a reel of relatively small diameter without injury to the portion of the hose adjacent the end of the coupling.

Another object of the invention is to provide a hose clamping structure which will eliminate the danger of separation of the hose from the coupling sleeve.

Further objects of the invention reside in the construction of the expansion ring, the form of the recess within which the hose is clamped and the proportions of the engaged parts of the assembly in relation to each other.

Other objects and advantages more or less ancillary to the foregoing and the manner in which all the various objects are realized will appear in the following description, which considered in connection with the accompanying drawing, sets forth the preferred embodiment of the invention.

In the drawing:

Fig. 1 is a longtudinal sectional view of a hose coupling embodying the improved clamp; and Fig. 2 is a similar view of one of the members of the coupling illustrating the assembly tool and the condition of the hose before deformation of the expansion ring.

Referring first to Fig. 1, the hose coupling comprises a pair of tubular bodies 10 and 11 formed with enlarged end portions 12 having conical bores 13 therein which are provided with internal annular ribs 14 in the outer ends thereof. The coupling member 10 is further formed with a threaded shank 15 for the reception of a sleeve 16 swiveled upon the companion member 11. The hose section 17, as shown in Fig. 2, is inserted in the bore 13 with the end thereof in abutting engagement with a rubber washer 18 seated against a shoulder 19 at the base of the bore 13. The portion of the hose within the conical bore is provided with a tubular expansion ring 20 having a bead 21 in the outer end thereof disposed in assembly adjacent the inner edge of the rib 14. The bead 21 is preferably formed by folding the outer end of the tube inwardly upon itself and swaging the overlapped portion to provide a smooth even radius in the bead.

The body member 10 and sleeve 16 are formed with radially extended lugs 22 to accommodate the retention of the body and rotation of the sleeve during assembly of the parts in threaded engagement with each other. The sleeve is constructed to swivel about a still thread 23 in the inner end of the member 11, a rubber gasket 24 being impinged between the shoulder 25 adjacent the still thread and the end of the shank 15.

The hose is secured in clamped relation with the coupling members by expanding the ring 20 under the influence of a tapered draw bar 26 and articulated fingers 27 until the hose is compressively engaged with the wall defining the conical bore 13. It will be noted that when the parts are thus assembled the rounded corner or bead 21 in the end of the ring will lie in lineal spaced relation with the inner side wall of the rib 14 and that rounded face of the rib is engaged with the peripheral surface of the hose without penetration or deformation thereof.

In practice it has been found that a clamping structure of this character may be substantially reduced in length as compared with similar devices heretofore in use, that such reduction in length together with the rounded corners and staggered relation of the bead and rib will facilitate coiling of the hose upon a relatively small reel without deleterious effects, that the securement of the hose between the ring and body member of the coupling will produce an efficient and durable connection and that impingement of the hose at a point remote from the free end thereof will prevent rupture of the fabric, fraying and separation thereof, deformation of the wall of the hose and the consequent failure of the clamping medii in the coupling.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A hose coupling comprising a body member having a conical bore therein for the reception of the end portion of a hose, an annular internal rib in the outer end of said body member, a shoulder at the inner end of said bore, a deformable washer in said bore disposed in abutting relation with said shoulder and the end of the hose, an expansible ring within the hose and washer, a rounded bead in the outer end of said ring, said bead being disposed in longitudinal spaced relation with said rib, the opposed end of said ring being disposed in abutting engagement with the shoulder and in supporting relation with the washer when the ring is expanded for compressive engagement with the hose and washer.

2. A hose coupling comprising a body member having a conical bore therein for the reception of the end of a section of hose, a shoulder at the inner end of said bore, a rubber washer intermediate said shoulder and the end of the hose, an internal rib in the outer end of the body, a ring engaged with the inner wall of the portion of the hose within said bore and within said washer, said ring being disposed in abutting engagement with said shoulder and supporting relation with the deformed hose and washer when expanded.

DONALD P. GLESSNER.